Nov. 16, 1965    L. E. HARLIN    3,217,978
LUBRICATION SYSTEM FOR AUTOMOTIVE COMPRESSORS
Filed July 9, 1963    2 Sheets-Sheet 1

INVENTOR
LESTER E. HARLIN
BY Sidney N. Rosenfeld
ATTORNEY

United States Patent Office 3,217,978
Patented Nov. 16, 1965

3,217,978
LUBRICATION SYSTEM FOR AUTOMOTIVE COMPRESSORS
Lester E. Harlin, Springettsbury Township, York County, Pa., assignor to Borg-Warner Corporation, Chicago, Ill., a corporation of Illinois
Filed July 9, 1963, Ser. No. 293,666
4 Claims. (Cl. 230—206)

This invention relates to a compressor and more particularly to the lubrication of both a crankshaft end bearing and the connection between the crankshaft and a connecting rod.

In several types of compressors, as for example refrigerator compressors, the oil employed as a lubricant for the moving parts becomes mixed with the refrigerant. Upon expansion of the refrigerant, the mixture, which might well be described as a foam, creates certain lubrication problems whenever lubrication circulation of a forced nature is employed in the device. Problems, akin to those associated with cavitation, arise between the bearing interfaces of relatively movable elements and create problems of vibration, uneven wear and the like. While the separation of a gas from a liquid may itself be achieved in various ways, being a common problem in certain arts, the use of such prior separation methods and devices has been substantially unrecognized in the compressor art, presumably because the structures employed for the separation of a liquid and an entrained gas would be quite expensive if employed in a compresosr.

Another problem frequently encountered in the compressor arts is the lubrication of the connection between the crankshaft and a connecting rod. This problem is often particularly acute whenever it is desired to provide a continuous or recirculating flow of lubricant to the connection.

Accordingly, it is an object of the present invention to provide a means for separating entrained gases in a liquid lubricant in a compressor.

It is a further object of the present invention to provide means for separating entrained gas from a lubricating liquid in a compressor wherein the difference in mass between the gas and the liquid is employed to effect separation.

It is a further object of the present invention to provide means in a compressor for separating an entrained gas from a lubricating liquid at a bearing location in the compressor to enable the lubricant to be used at a bearing interface immediately after gas separation.

It is a further object of the present invention to provide a compressor including a means for separating entained gas from a lubricating liquid wherein the separation is effected by a difference in a mass between the gas and the liquid and wherein no separate external means are required to maintain continuity of separation.

It is a further object of the present invention to provide means for lubricating the connection between a connecting rod and a crankshaft in a compressor, the lubrication being forced and continuous.

It is a further object of the present invention to provide a compressor which may be installed and operated in any position from horizontal right to horizontal left, i.e., upright or on either side or any intermediate position with changes being required relative to its lubrication.

It is a further object of the present invention to provide a compressor which may be operated in either a clockwise or counter-clockwise rotation.

It is a further object of the present invention to provide a compressor which retains its lubricating oil thereby maintaining relatively oil free refrigerant and effecting an increase in capacity.

These and other objects will become apparent from the following description.

Figure 1:
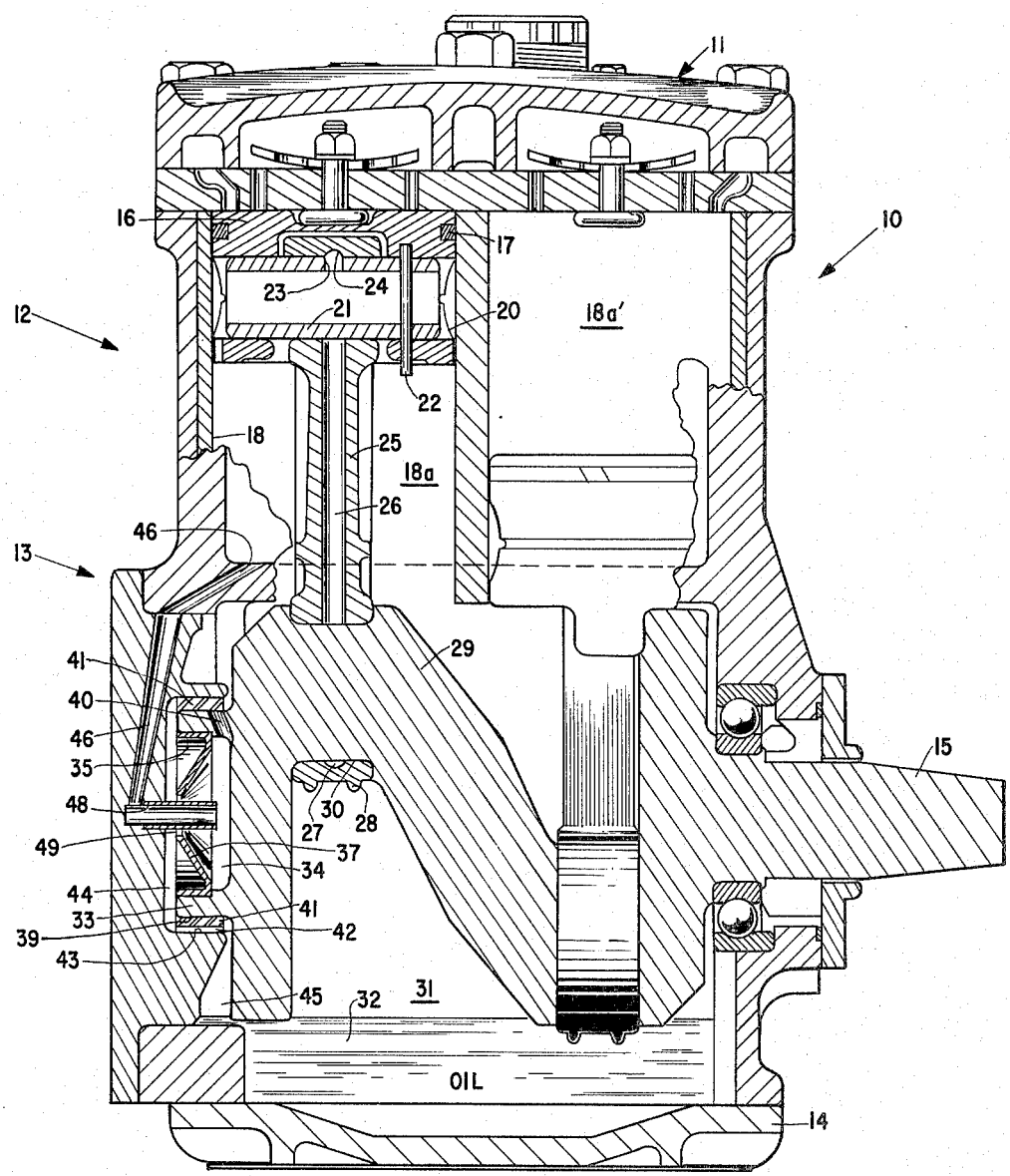
FIGURE 1 is a partial elevational sectional view of a compressor according to the present invention.
Figure 2:
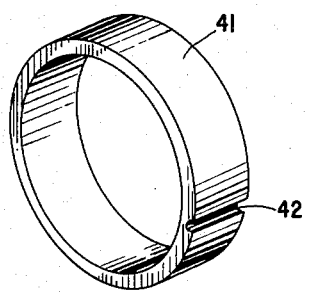
FIGURE 2 is a perspective view of a bearing element employed in the compressor shown in FIGURE 1.
Figure 3:
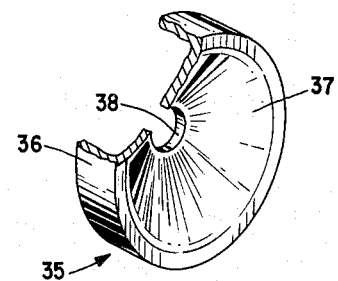
FIGURE 3 is a perspective view of a flow directing element shown in FIGURE 1.

Referring now to FIGURE 1 of the drawings, the numeral 10 denotes generally a compressor including an upper portion denoted by the numeral 11. The numeral 11 is intended to designate conventional elements in a compressor such as the manifold, gasket, any type of valve or valves associated therewith, etc. The numeral 12 denotes generally the upper external side portions of the compressor 10 which surround the cylinders and plenums and merge with lower or basal portions 13 of the compressor. The numeral 14 denotes the base portion of the compressor. A crankshaft 15 of generally convention construction extends outwardly from the body portion 13 of the compressor and one end thereof is adapted to carry a gear, pulley or other drive member which supplies rotary energy to the compressor.

The numeral 16 denotes one of a plurality of vertically reciprocating pistons each of which includes a piston ring 17 positioned in an annular groove around the piston. The ring 17 snugly engages the interior surface 18 of the cylinder 18a.

A transverse aperture denoted by the numeral 19 passes entirely through the piston 16 and the horizontal diametrical ends of the aperture are inwardly curved as denoted by the numeral 20. A sleeve 21 is positioned within aperture 19 and is held in place by a pin 22 positioned transversely of and extending completely through the sleeve and anchoring it to the piston. A relatively rotatable interface is defined by the exterior of the sleeve and the bore in the rod 25 through which it passes. An aperture 23 generally centrally of the sleeve 21 communicates with an annular recess 24 in the top portion of connecting rod 25. A passageway 26 extends longitudinally through the rod and communicates with the recess 24 and an annular groove 27 in the bottom portion 28 of the connecting rod. Bight portion 29 of the crankshaft 15 carries a machined surface 20 which abuts the inner surface of connecting rod portion 28 to define a relatively rotatable interface between the connecting rod and crankshaft.

The numeral 31 denotes a sump within the portion 13 of compressor 10 and is adapted to carry therein a quantity 32 of lubricating oil. It will be observed that sump 31 communicates with the cylinder of piston 16.

The numeral 33 denotes the left end of crankshaft 15 which is positioned and supported within lower portion 13 of the compressor. A recess 34 centrally of end 33 receives a flow-directing sheet metal element denoted generally by the numeral 35 defined by a circumferential side flange or wall 36, one edge periphery of which is in integral communication with frusto-conical section 37 having a central aperture 38 therein. It will be observed that the aperture 38 lies generally on the plane defined by the other edge periphery of flange 36. The flow-directing member 35 is maintained within recess 34 as by a press fit although any suitable securing means may be employed. Further, while flow-directing member 35 has proven satisfactory when fabricated from sheet metal, it will be understood that any convenient material of construction may be employed so long as its general configuration and function is preserved.

Numeral 40 denotes a fluid passage between the external bearing surface 39 of shaft end 33 and recess 34. The numeral 41 denotes a bronze plated steel bearing in the general form of a ring whose outer surface is provided with a trough 42 extending thereacross. The numeral 43 denotes the surface of the annular recess in the left end of portion 13 of the compressor which receives bearing 41, with the trough 42 positioned generally at the lowest portion thereof. Any convenient means of fixing bearing 41 to the surface 43 may be employed, a press fit having been found satisfactory. The external bearing surface 39 of the left end of the crankshaft 15 is received by the inner surface of the ring 41 in relatively rotatable relationship with the port 40 communicating with the interior surface of the ring.

A small plenum or chamber 44 communicates with one end of trough 42 and the trough's other end communicates with an entrance region 45 immediately below the trough and adjacent one portion of the crankshaft 15. The region 45 may be regarded as a portion of sump 31.

Figure 4:
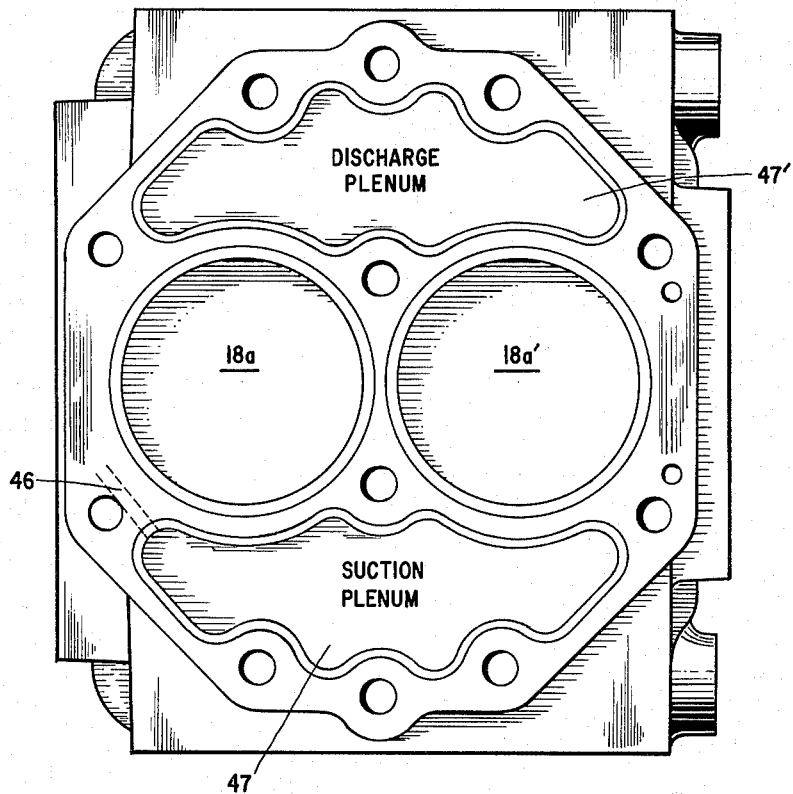
FIGURE 4 is a plan sectional view of a compressor according to the present invention.

A port 46 leads from a suction or intake plenum 47 (see FIGURE 4) to one end of a sleeve 48 positioned within a wall of portion 13 of the compressor. The right portion of the sleeve extends beyond the plane of aperture 38 of flow-directing member 35 and a clearance denoted by the numeral 49 exists between the external portion of the sleeve and the aperture 38. As illustrated at FIGURE 4, the compressor may include another cylinder 18a' and a discharge plenum 47'. By suitable valving arrangements, the compressor intake is fed to the suction plenum 47 and the output is fed to the discharge plenum 47'. Typically, the pressure in the suction plenum may be 15 p.s.i.g. and that in the discharge plenum 185 p.s.i.g.

The operation of the compressor will now be described with respect to the cylinder 18a.

The crankshaft 15 receives rotary energy from an external source and compresses the refrigerant in the cylinder 18a. A portion of the refrigerant escapes from the compression volume above the piston and between the piston ring and the cylinder wall. This escape is due to the small but finite clearance between the piston ring and the cylinder wall 18. The refrigerant falls to the sump and becomes mixed with the lubricant therein. The mixture of refrigerant and oil in sump 31 becomes agitated due to the portions of the crankshaft passing into and out of it and a froth or foam consisting of the refrigerant gas and the lubricant is formed. It will be observed that, due to blow-by gas past the piston ring, the pressure in the sump 31 is greater than the pressure in the suction or intake plenum 47. Part of the foam finds its way to region 45 and thence upwardly into one end of trough 42 in bearing ring 41. Passing therethrough, the foam passes upwardly into plenum 44. From the plenum 44 the foam passes through clearance space 49 into recess 34. The foam exiting from the right end of the sleeve 48 falls downwardly upon the interior portions of recess 34 and portion 37 of flow director 35. The foam now begins to rotate about the axis of rotation of the crankshaft 15. The mass of the lubricant being greater than the mass of the expanded refrigerant gas, a shell or layer of the lubricant is built-up around the outer circumference of recess 34 while the radially innermost portion of the recess contains the less dense gas. The liquid lubricant exits through passage 40 onto the interior surface of stationary bearing ring 41 to lubricate that surface. The separated gas, the less dense portion of the foam, passes through sleeve 48 and upwardly into passage 46 where it is discharged into suction plenum 47 with other refrigerant to be compressed. It will be observed that the lubricant-refrigerant froth mixture is constrained to pass from the sump 31, through recess 34, and thence to the suction plenum by the pressure difference existing between the sump 31 and the suction plenum 47.

The description will not treat of the lubrication of the connecting rod to the crankshaft journal.

Upon revolution of the crankshaft 15, the lubricant 32 in sump 31 is agitated by the revolving crankshaft and portions of the lubricant are thrown against the walls of cylinder 18a. Upon downward motion of the piston 16 from the position illustrated, the piston ring 17 scrapes lubricant from the surface of the cylinder into the sleeve 21. A portion of this lubricant finds its way through sleeve aperture 23 and thence into groove 24 in the top of connecting rod 25 and downwardly through passage 26 into circumferential groove 27 in the bottom of connecting rod 25. From here, it passes, by virtue of the clearance at the journal, to the relatively rotatable interface of the lower portion 28 of the connecting rod and bearing surface 30 of the crankshaft.

I claim:

1. A lubricated bearing construction comprising a stationary housing receiving a relatively rotatable member, said rotatable member having a recess in the end thereof; a stationary bearing ring interposed between said stationary housing and said rotatable member, said bearing ring having a trough extending across one of its surfaces, one end of said trough being in fluid communication with said recess, the other end of said trough communicating with the interior of said housing, said trough providing a flow path from the interior of said housing to said recess; means defining a liquid flow passage through said rotatable member between said recess and a portion of the bearing surface on said bearing ring; a conduit extending into said recess and located relative to said liquid flow passage such that a mixture of gas and liquid entering the recess through said trough will be separated by said centrifugal action, the liquid passing to said bearing surface and the gas passing out of said recess through said conduit.

2. Apparatus as defined in claim 1 including a frusto-conical flow directing member positioned within said recess, said flow directing member having an aperture surrounding but spaced from said conduit to provide a clearance therebetween, said flow directing member cooperating with said recess to define a chamber having an inlet portion around said conduit and an outlet portion defined by said liquid passage through said rotatable member.

3. In a compressor, a lubricated bearing construction including a stationary housing having a cavity therein, said cavity receiving one end of a crankshaft, said crankshaft end having a recess therein, said crankshaft being supported within said cavity, a bearing interface between the relatively rotatable portions of said crankshaft end and said cavity support therefor, a passageway between said bearing interface and said recess in the crankshaft end, a flow directing member positioned within said recess and having an aperture in the central portion thereof and substantially closing off said recess in said crankshaft end except for said aperture, a conduit within said housing and communicating with a flow passage therein and having a portion extending through said aperture and into said recess carried by said crankshaft end, a sump defined by said cavity, a fluid port between said sump and said aperture in the flow directing member, whereby lubricant and gas entrained therein passing into the recess carried by the shaft from the sump will be separated by centrifugal action with the liquid lubricating passing to the bearing interface and the entrained gas formerly therein passing from the recess through the conduit.

4. The construction of claim 3 wherein the said flow directing member includes a continuous portion sloping toward said aperture.

References Cited by the Examiner

UNITED STATES PATENTS

| | | | |
|---|---|---|---|
| 2,100,799 | 11/1937 | Drysdale | 230—206 |
| 2,298,749 | 10/1942 | Buschmann | 230—206 |
| 2,308,376 | 1/1943 | Mader | 184—6 |
| 2,423,719 | 7/1947 | Muffy | 230—206 |
| 2,440,812 | 5/1948 | Simpson | 184—6 |
| 2,888,193 | 5/1959 | Greenwald | 230—207 X |

LAURENCE V. EFNER, *Primary Examiner.*

ROBERT M. WALKER, *Examiner.*